United States Patent [19]

Millgard

[11] Patent Number: 5,127,765
[45] Date of Patent: Jul. 7, 1992

[54] SYSTEM FOR IN-SITU TREATMENT OF UNDERWATER CONTAMINATED MATERIAL

[75] Inventor: V. Dennis Millgard, Orchard Lake, Mich.

[73] Assignee: Millgard Environmental Corporation, Livonia, Mich.

[21] Appl. No.: 735,849

[22] Filed: Jul. 25, 1991

[51] Int. Cl.$^5$ .................. B09B 5/00; E02D 5/40
[52] U.S. Cl. .................. 405/128; 405/223; 405/233; 405/266
[58] Field of Search .............. 405/128, 129, 258, 263, 405/266, 269, 240, 241, 222, 223, 233; 175/19, 21, 424

[56] References Cited

U.S. PATENT DOCUMENTS

| | | | |
|---|---|---|---|
| 1,089,184 | 3/1914 | Bolen | 405/240 |
| 1,856,604 | 5/1932 | Upson | 405/240 X |
| 4,072,016 | 2/1978 | Seki et al. | 405/266 |
| 4,072,017 | 2/1978 | Shiraki | 405/269 X |
| 4,084,383 | 4/1978 | Kukino et al. | 405/269 |
| 4,402,630 | 9/1983 | Miura et al. | 405/266 |
| 4,566,825 | 1/1986 | Hirai et al. | 405/267 |
| 4,643,617 | 2/1987 | Kanno et al. | 405/222 |
| 4,776,409 | 10/1988 | Manchak | 405/266 X |
| 4,834,194 | 5/1989 | Manchak | 405/263 X |

FOREIGN PATENT DOCUMENTS

| | | | |
|---|---|---|---|
| 97717 | 4/1989 | Japan | 405/267 |
| 2079345 | 1/1982 | United Kingdom | 405/269 |

Primary Examiner—Randolph A. Reese
Assistant Examiner—John A. Ricci
Attorney, Agent, or Firm—Lloyd M. Forster

[57] ABSTRACT

System including method and apparatus for treating contaminated underwater sediment by lowering a hollow casing to an underbed, lowering a power driven Kelly bar with injecting and mixing blade fed with treatment material such as solidifying cement and flyash, providing a top cover for confining the sediment to be treated within the casing, injecting and mixing the treatment material through the Kelly bar, and sequentially moving the casing with Kelly bar to adjacent treatment locations.

9 Claims, 4 Drawing Sheets

SYSTEM FOR IN-SITU TREATMENT OF UNDERWATER CONTAMINATED MATERIAL

BACKGROUND OF THE INVENTION

Hazardous contaminated waste materials are encountered on both land and in water bodies. Drill apparatus and methods for in-situ fluid treatment of contaminated soils are disclosed in copending U.S. patent application Ser. No. 07/514,404, filed on Apr. 26, 1990. The present application is directed to a water body treatment system for sedimentary silt, sludge, hazardous waste, or other contaminated material which has settled in a lake, river, canal, pond, lagoon or like water body. Typically in industrial areas, for example, heavy metal such as lead, cadmium, chromium, mercury, may be present in the bottom of water bodies, which may contaminate water supply, swimming areas, fish, or otherwise create an environmental problem requiring remedy.

Conventional methods usually involve dredging with a need for hauling contaminated material to appropriate dump sites, which may be remote from the dredging site. In some cases, chemical or microbiological treatment has been attempted or proposed with accompanying problems of feasible distribution and containment.

BRIEF DESCRIPTION OF THE PRESENT INVENTION

Sequential, sectional treatment of confined treatable portions of the submerged bottom of water bodies is effected by lowering a large square casing into the contaminated material such as sedimentary silt, sludge, hazardous waste or other contaminated material, which has settled at the bottom of the water body. The depth where the bottom edge of the square casing reaches a required penetration may involve a register and seal against a solid subsurface such as rock, or into an impervious clay layer or a specific elevation. The top of the casing should extend above the water elevation enough to allow holding it in place and also not to allow water to move into or out of the casing.

A top confinement cover shroud with a rotary Kelly bar projecting therethrough is lowered within the square casing, with substantial perimeter clearance, through the water down to a level abutting, or closely adjacent the top surface of the contaminated material. The water passes gently between the casing as the shroud is lowered to required position at which position an inflatable perimeter tube is expanded with a fluid, in most cases water, into sealing contact with the inner walls of the square casing to thereby provide a pressure seal with complete confinement for a discrete portion of the contaminated material to be treated.

A rotary blade at the bottom end of the Kelly bar system having fluid passages extending to discharge ends is supplied with fluid treating material which, through rotation of the blade, is distributed and mixed throughout the confined portion of contaminated material. In a typical case, the treatment material may be a cement and flyash slurry which will set and harden over a period of hours to thereby encapsulate and render harmless the contaminated material.

The square casing is lowered and raised by a crane on land reaching out over the water; or as more practical in most cases, the process will be performed by a crane mounted on a floating barge secured by corner jacks engaging a solid bottom of the water body. The crane is mounted on a mobile tractor movable along the edge of the barge to successive positions for sequential overlapping treatment of successively isolated and confined portions of the contaminated material. Upon completing treatment at successive sections along the entire length of the barge, the jacks are raised and the barge moved to a position for treating the next row of square portions of the contaminated material. Maximum coverage with minimum number of successive treatment positions can be accomplished by employing large casings, e.g., in the order of fourteen feet square side dimension covering an area of almost two hundred square feet per treatment site.

Depending on the nature of the contamination, optionally different treatments may be administered to the confined material. In the case of hard setting cement treatment, withdrawal of the casing before any appreciable setting takes place is feasible due to retention of the treated material, thoroughly coated by pressurized dispersion and mixing by the Kelly-driven blade, by surrounding portions of untreated material. Overlapping of successive treatment sites will assure ultimate continuous solid encasement of the entire contaminated water bed.

In the case of nonsolidifying treatment, the confinement of discrete portions of the contaminated material during administration of the treatment fluid provides an accurate control for the ratio of fluid injected and thoroughly mixed per predetermined volume of contaminated material.

DETAILED DESCRIPTION OF REPRESENTATIVE EMBODIMENT

Figure 1:
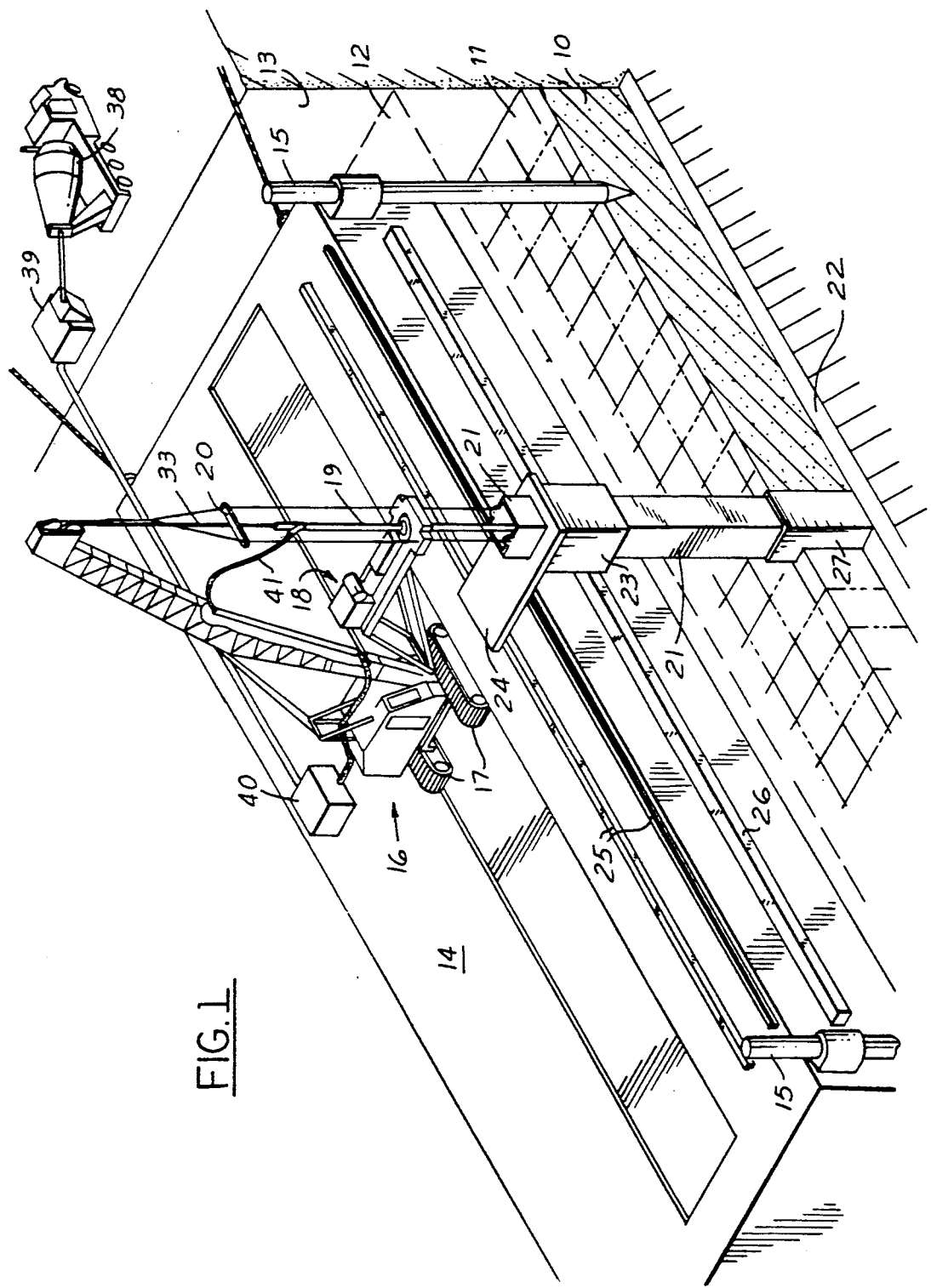
FIG. 1 is a perspective schematic view of typical water site process equipment for treatment of a contaminated material bottom.
Figure 1A:
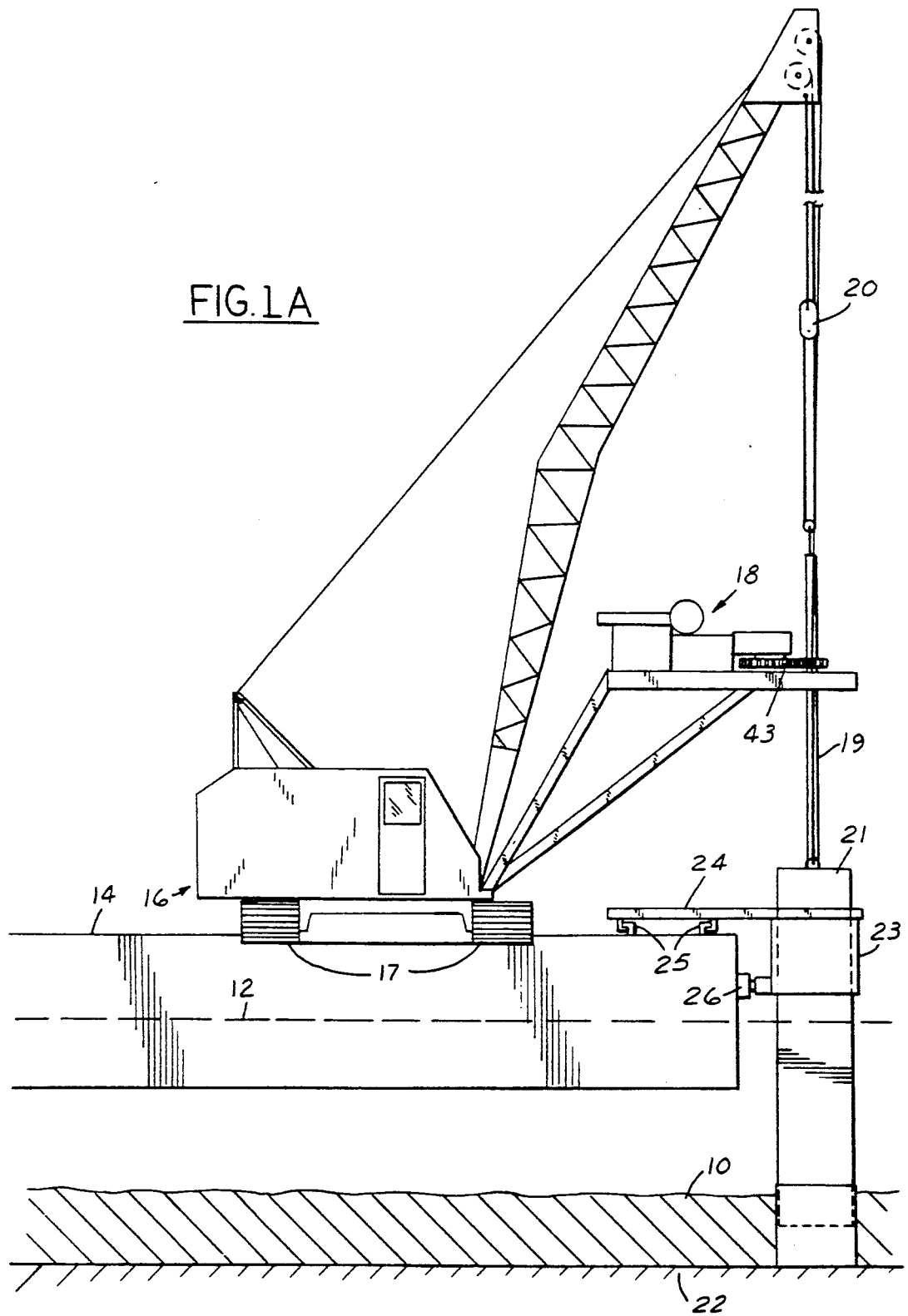
FIG. 1A is a schematic side elevation of the equipment shown in FIG. 1.

With reference to FIG. 1, a representative project for the practice of the present invention involves the treatment of sedimentary silt, sludge, hazardous waste or other loose contaminated material 10, which has settled at the bottom of a canal, extending to an upper level 11 at the bottom of canal water 12, retained within vertical canal walls 13. Barge 14, typically of modular float design such as commercially available, is anchored with jack spuds 15 and carries mobile crane 16 with crawler drive 17 for incremental movement to successive locations along the edge of the barge. Cantelevered drive unit 18 for Kelly bar 19 extends below suspension bridle 20 for lowering and raising square casing 21 to and from underbed 22 of the contaminated material 10. Casing guide 23 mounted under template 24 is slidable along guide rails 25 and stabilized by guide rail 26 while moved by cable drive means, not shown, synchronized with crane 16 to each location as indicated by checkerboard squares superimposed on upper level 11.

Figure 2:
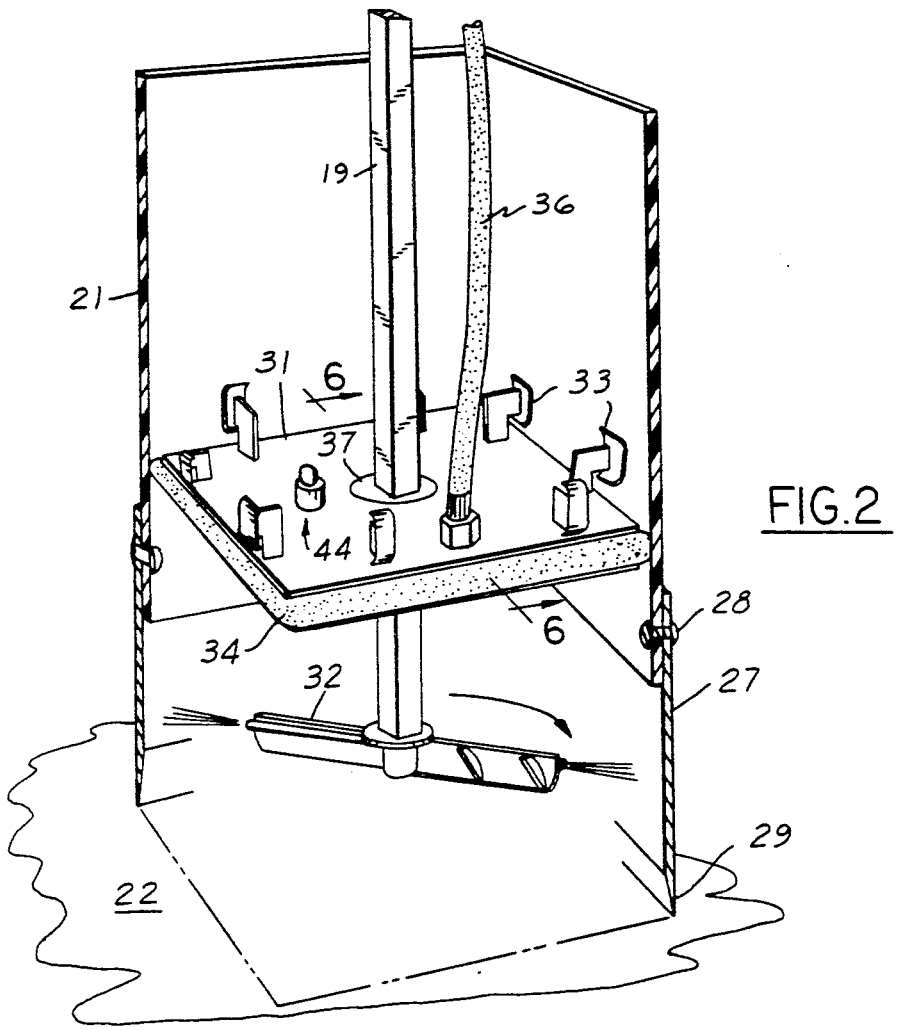
FIG. 2 is a fragmentary perspective view illustrating the treatment end of casing with closure cover shroud and mixing tool in place.
Figure 3:
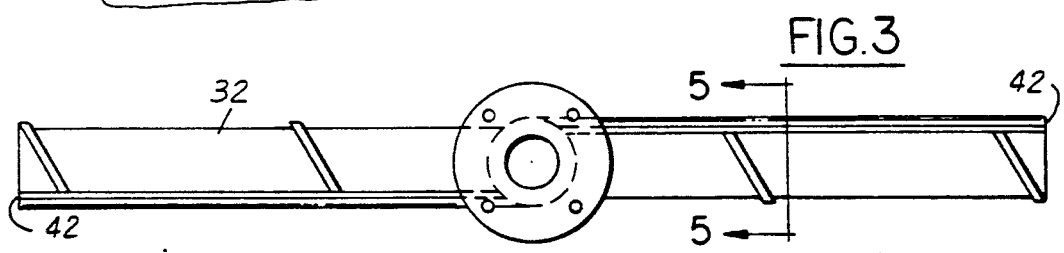
FIG. 3 is a plan view of the mixing tool per se.
Figure 4:
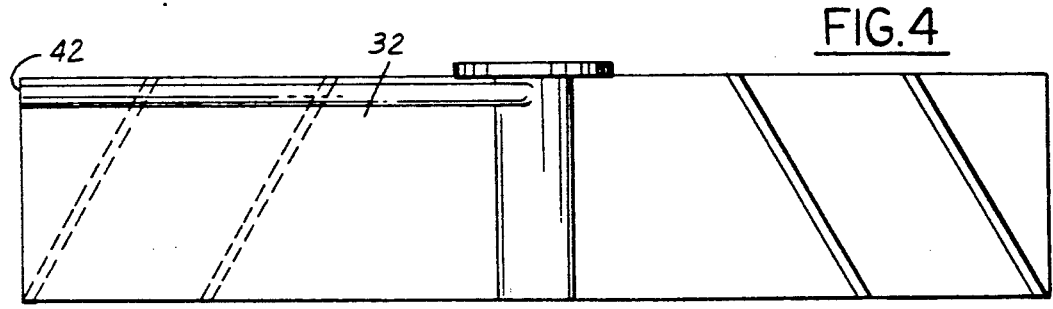
FIG. 4 is a side elevation of the mixing tool shown in FIG. 3.
Figure 5:
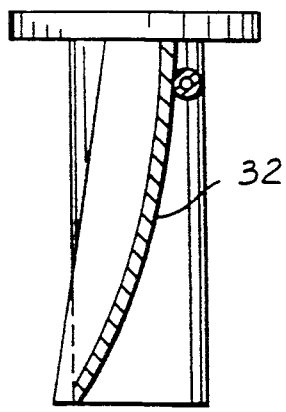
FIG. 5 is a sectional view taken along the line 5—5 of FIG. 3.
Figure 6:
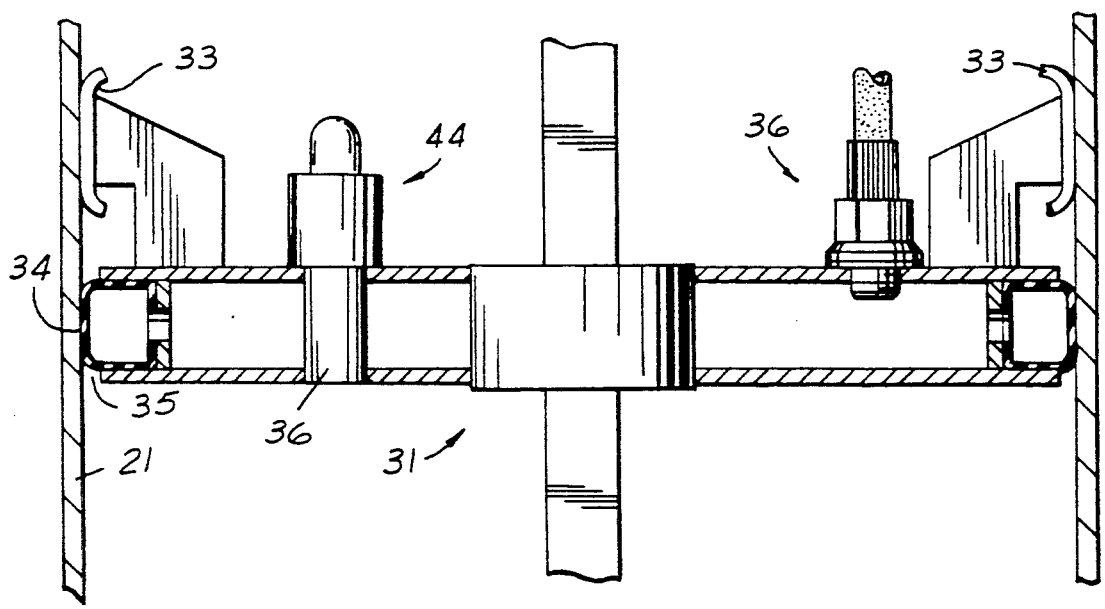
FIG. 6 is a sectional view of the enclosure confinement cover shroud illustrated in FIG. 2.
Figure 7:
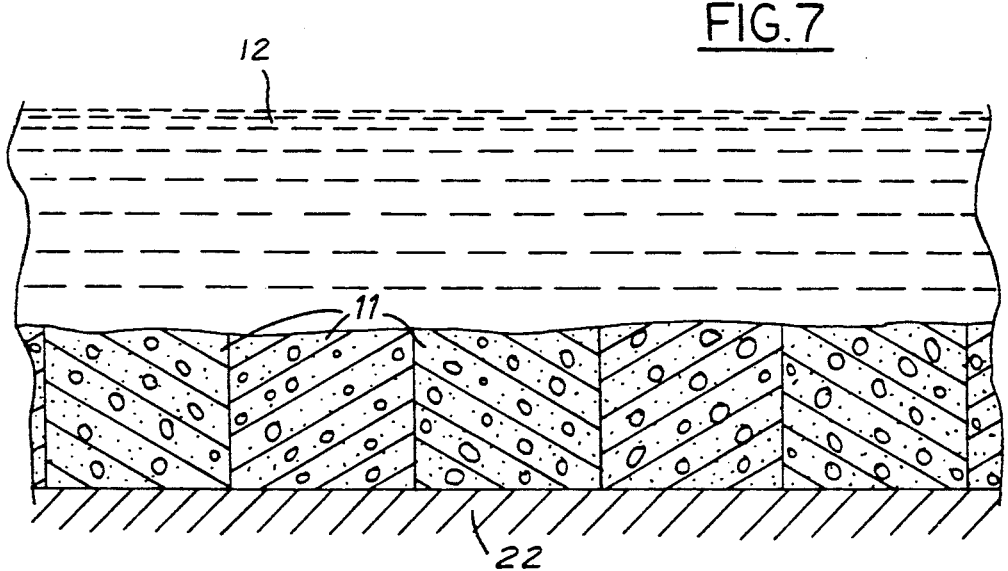
FIG. 7 is a fragmentary schematic view illustrating sectionalized treated portions of contaminated material at the bottom of a water body.

With additional reference to FIG. 2, the lower end of casing 21, preferably constructed of fiberglass, is provided with steel extension 27 suitably connected, as by rivets or bolts 28, with a lower edge 29 sharpened to facilitate penetration. When casing 21 has reached an operating location, which may be assisted by appropriate vibration if necessary or desired to facilitate placement, the bottom edge 29 of extension 27 will be in sealing relation with underbed 27. Confinement of the loose material to be treated is completed by cover shroud 31, normally resting during vertical transit on top of mixing blade 32, secured to the lower end of Kelly bar 19. Laterally extending shoes 33 mounted on cover shroud 31 engage the inner casing wall to guide movement of the shroud. Inflatable bladder 34 extending around the perimeter of cover shroud is deflated during vertical movement permitting water to pass through substantial clearance 35, as best illustrated in FIG. 6, which may be in the order of six inches in a fourteen foot square casing.

When the shroud has reached a confining position on top of or adjacent the loose material to be treated, bladder 34 is inflated with fluid fed through tube 36 to engage against the casing wall to seal and retain the cover in treatment position whereupon Kelly bar 19 may be further lowered through rotary bearing 37 to a discharge and mixing position, such as illustrated in FIG. 2. Treatment material is pumped through the Kelly bar system from a supply truck 38, pumping stations 39 and 40 and supply line 41. Such treatment material, typically cement and flyash, is discharged through ends 42 of mixing blade 32 driven by Kelly bar 19 through gearing 43 on the cantelevered drive system 18 mounted on crane 16. A suitable pressure release valve 44 accommodates overflow of confined material from intrusion of treating material introduced through the Kelly bar.

Upon completion of thorough mixing, rotation of the Kelly bar is stopped and blade 32 raised into supporting engagement with cover shroud 31 whereupon bladder 34 is deflated and the cover shroud slowly raised above the water level. Casing 21 then may be raised at least to a clearance position over the sediment to be treated. Movement of the crane to the next treatment position may be effected without necessity for raising the casing entirely out of the water.

When cement is employed for the treatment, four to forty-eight hours may be involved in curing, so that sequential adjacent portions of contaminated sediment may be treated with overlapping successive confinement of each portion prior to hardening, thereby providing an ultimate continuous solidification of the sediment. By treating known incremental volume at each position, an accurate ratio of treatment material may be administered in contrast with any attempt to inject and mix treatment material with sediment without confinement.

When an entire row of treatment sites has been completed, the barge may be moved laterally to a position for treating the next row of locations. Each location may involve a cycle time in the order of one half hour to forty-five minutes, when employing a fourteen foot square casing, in treating a depth of four to twelve feet of sediment at the bottom of a twenty foot deep water level, as a typical example.

It will be understood that the treated sediment, which will require four to forty-eight hours to harden, is released from casing confinement each time the casing is raised. The ratio of treatment material is established while the casing is in place and will not be substantially affected by removal of the casing due to retention of each treated portion of sediment by surrounding treated or untreated substantially static material. Furthermore, the thorough mixing effected by the rotary blade results in coating the sediment with treatment material, which upon eventual hardening, effectively suppresses the contamination. While the treatment process is relatively sophisticated compared to simple dredging, it eliminates the requirement for trucking to landfill or other disposal sites where the contaminated material would not constitute a health hazard and is estimated to involve a substantial cost saving as compared to dredging in the aforementioned contemplated project.

I claim:

1. Water body treatment apparatus means for injection of treatment material for treating sedimentary silt, sludge, hazardous waste or other contaminated material which has settled at the bottom of a river, canal, pond, lagoon or like water body, comprising hollow casing means for substantially totally confining treatable portions of said material in-situ including cover means to provide enclosure confinement inserted within said hollow casing to the upper level of said contaminated material prior to injection of said treatment material, means for injecting and mixing said treatment material during confinement in each portion, means for terminating each confinement, means for moving said casing with its cover means to and confining successive adjacent portions to thereby effectively treat entire designated areas of a given water bed.

2. Apparatus of claim 1 including inflatable perimeter means for said cover means to effectively seal the upper level of said contaminated material during injecting and mixing of said treatment material.

3. Apparatus of claim 2 including Kelly bar means insertable within said casing under said confinement cover with means for effecting injection and mixing of treatment material with the confined portion of said contaminated material.

4. Apparatus of claim 3 including rotatable blade means at the lower end of said Kelly bar means for dispensing and mixing said treatment material with said contaminated material.

5. Apparatus of claim 1 including the provision of sharpened tapered bottom attachment for said casing to facilitate penetrating to the bottom of said contaminated material.

6. Apparatus of claim 5 including means for vibrating said hollow casing to facilitate sinking to an impervious bottom surface of said water body under said contaminated material and thereby provide an effective bottom seal for confinement within said casing.

7. Apparatus of claim 1 including treatment equipment mounted on a floating barge.

8. Apparatus of claim 7 including mobile crane means mounted on said barge for transporting and placing said hollow casing at successive treatment locations.

9. Apparatus of claim 8 including vertical guide means for said casing with horizontal rail means on said barge for supporting said guide means.

* * * * *